United States Patent [19]

Yamaji et al.

[11] Patent Number: 4,495,562
[45] Date of Patent: Jan. 22, 1985

[54] JOB EXECUTION MULTIPLICITY CONTROL METHOD

[75] Inventors: Eiichi Yamaji, Ueno; Yoshie Ohno, Tokyo, both of Japan

[73] Assignee: Hitachi, Ltd., Tokyo, Japan

[21] Appl. No.: 271,048

[22] Filed: Jun. 4, 1981

[30] Foreign Application Priority Data

Jun. 4, 1980 [JP] Japan ............................. 55-74258

[51] Int. Cl.³ .......................................... G06F 15/16
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,426,331 | 2/1969 | Joyce | 364/200 |
| 3,905,023 | 9/1975 | Perpiglia | 364/200 |
| 3,910,322 | 10/1975 | Hardesty, Jr. et al. | 364/200 |
| 4,010,452 | 3/1977 | Cazanove | 364/200 |
| 4,068,302 | 1/1978 | Olmstead | 364/200 |
| 4,126,895 | 11/1978 | Weemaes et al. | 364/200 |
| 4,183,083 | 1/1980 | Chatfield | 364/200 |
| 4,217,636 | 8/1980 | Olmstead | 364/200 |
| 4,325,120 | 4/1982 | Colley et al. | 364/200 |
| 4,371,927 | 2/1983 | Wilhite et al. | 364/200 |

FOREIGN PATENT DOCUMENTS

| | | |
|---|---|---|
| 1162457 | 8/1969 | United Kingdom . |
| 1339090 | 11/1973 | United Kingdom . |
| 1408011 | 10/1975 | United Kingdom . |
| 1412051 | 10/1975 | United Kingdom . |
| 1452865 | 10/1976 | United Kingdom . |

OTHER PUBLICATIONS

Response Time Distribution Feature-IBM Technical Discl. Bulletin vol. 19, No. 9, Feb. 1977, p. 3524.

*Primary Examiner*—Gareth D. Shaw
*Assistant Examiner*—Ronni S. Malamud
*Attorney, Agent, or Firm*—Antonelli, Terry & Wands

[57] ABSTRACT

Herein disclosed is a job execution multiplicity controlling method, in which the used time periods of the central unit and the input/output device of at least one processor, respectively, are periodically measured for the respective jobs being executed in parallel in that processor, in which whether the present workload upon that processor is reasonable or not is judged in accordance with that measurement result, and in which a subsequent new job execution is started in that processor when that workload is lower.

18 Claims, 19 Drawing Figures

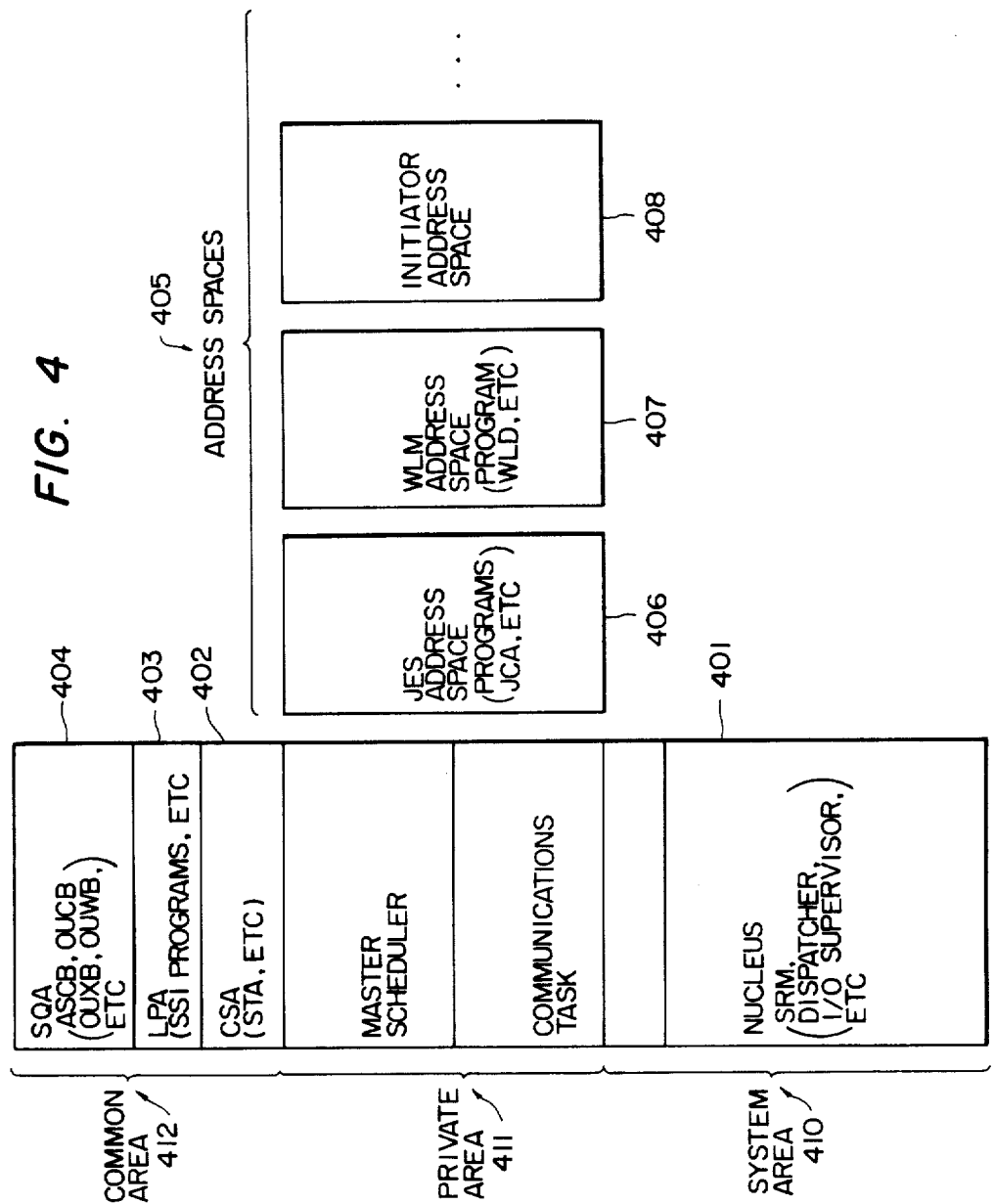

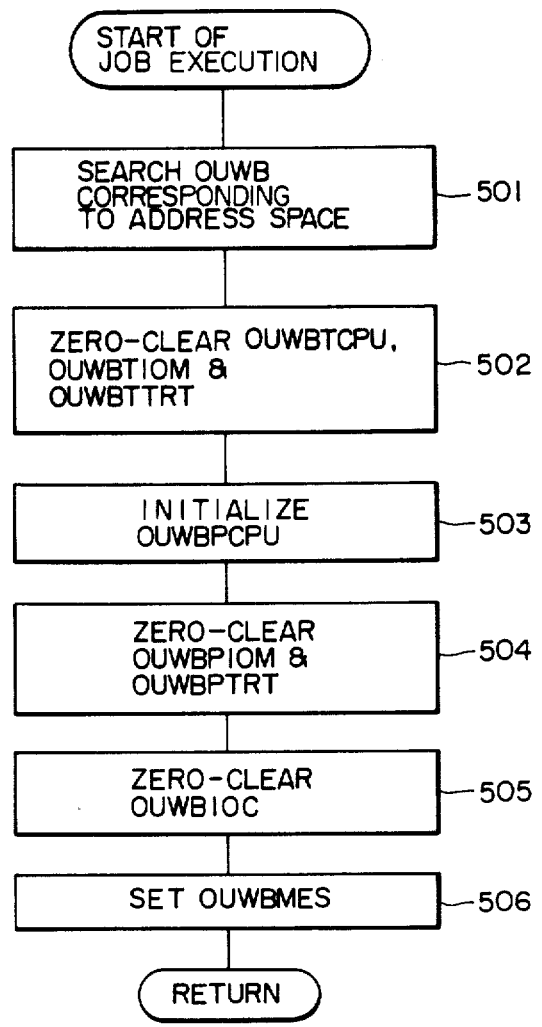

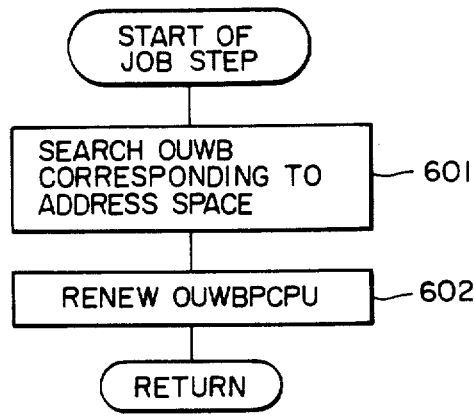
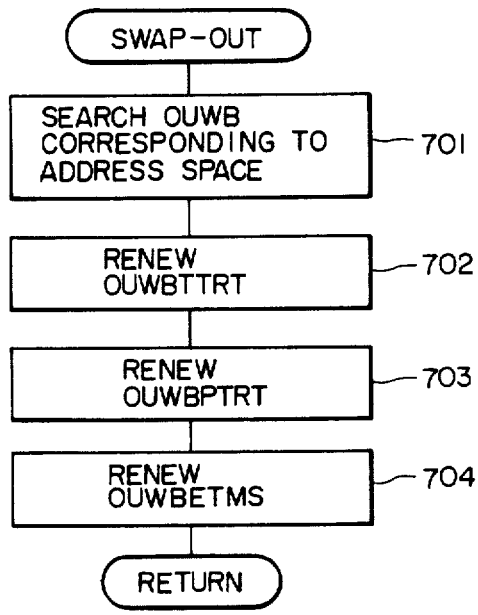

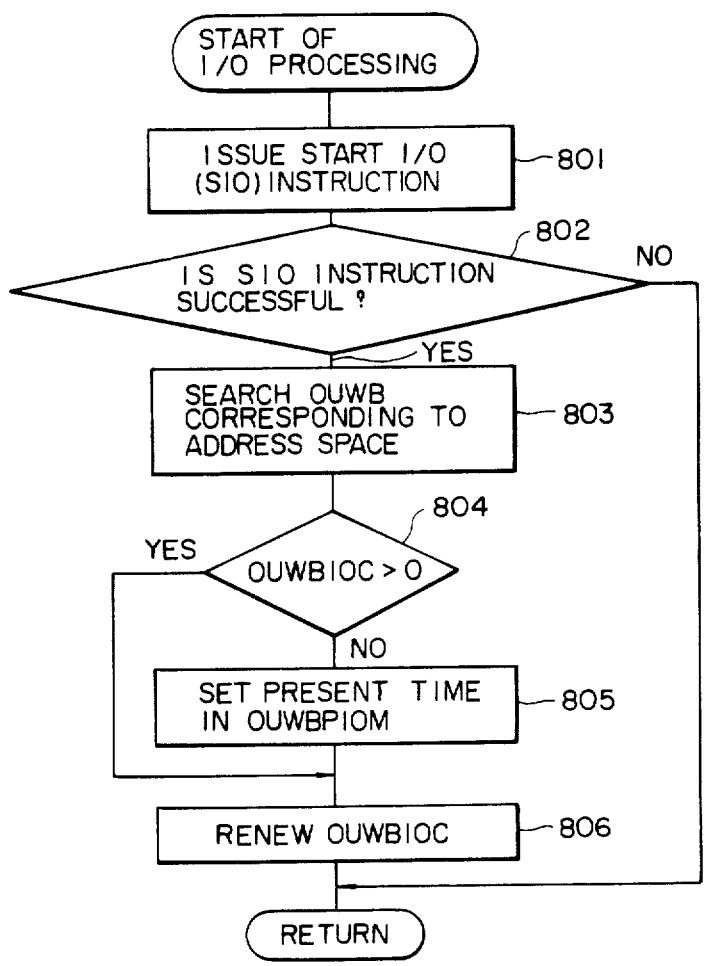

FIG. 17

WLD (Workload Data Area)

| | |
|---|---|
| ACCUMULATED TOTAL CPU TIME (WLDCPU) (4 BYTES) | ~1701 |
| ACCUMULATED TOTAL I/O TIME (WLDIOM) (4 BYTES) | ~1702 |
| ACCUMULATED TOTAL ELAPSE TIME (WLDTRT)(4 BYTES) | ~1703 |
| THRUPUT COEFFICIENT (WLDTRP) (4 BYTES) | ~1704 |
| AVERAGE PROGRESS RATE (WLDAPR) (4 BYTES) | ~1705 |
| DATA FRAG (1 BIT) | ~1706 |

FIG. 18

JCA (Job Control Area)

| |
|---|
| ENTRY 1 |
| ENTRY 2 |
| ENTRY 3 |
| ENTRY n |

JCA ENTRY

| | |
|---|---|
| PROCESSOR NAME (8 BYTES) | ~1801 |
| THRUPUT LIMIT (4 BYTES) | ~1802 |
| UPPER LIMIT OF AVERAGE PROGRESS RATE (8 BYTES) | ~1803 |
| LOWER LIMIT OF AVERAGE PROGRESS RATE (8 BYTES) | ~1804 |
| UPPER LIMIT OF MULTIPLICITY (2 BYTES) | ~1805 |
| LOWER LIMIT OF MULTIPLICITY (2 BYTES) | ~1806 |
| REASONABLE MULTIPLICITY (2 BYTES) | ~1807 |
| TOTAL INITIATOR NUMBER (2 BYTES) | ~1808 |
| ACTIVE INITIATOR NUMBER (2 BYTES) | ~1809 |

JOB EXECUTION MULTIPLICITY CONTROL METHOD

BACKGROUND OF THE INVENTION

The present invention relates to a method of controlling the number of jobs which are executed in parallel in a digital computer.

In order to increase in the processing capacity of a single processor system, which is constructed of a single processor (i.e., central processing unit), or to improve the reliability of the single processor system a multi processor system, having a plurality of processors may be used. Multi processor systems are divided into several kinds in accordance with the manner in which the respective component processors are coupled to each other. One is a system, in which the respective processors share a DASD (i.e., Direct Access Storage Device) (e.g., a disc device) thereamong and are coupled to each other in a distributed type manner by the use of a CTCA (i.e., Channel To Channel Adaptor). This system is called an LCMP (i.e., Loosely Coupled Multi Processor) system, and is different from a TCMP (i.e., Tightly Coupled Multi Processor) system, in which the respective processors share a main memory unit there and are operated under the control of a single OS (i.e., Operating System).

FIG. 1 shows an example of the construction of the LCMP system which is costructed of three processors. In this example, a single global processor 1 performs the input of jobs from an input device such as a card reader 3 and the output of the job execution result to an output device such as a line printer 4 and the distribution of the job to itself and the local processors 2. The global processor 1 and the respective local processors 2 share a drum unit 5, i.e., one file on the DASD through a channel switch (not shown) so as to transfer a variety of data relating to the job and are connected through a CTCA 6 so as to transfer control data such as the output demand of the job or the information of the termination of the job execution. The input and output of the job are performed in the global processor 1, but TSS (i.e., Time Sharing System) terminals 7 can be connected with the local processors 2, too, so that the TSS job is executed in the processor 1 or 2 which is connected with the TSS terminals 7.

Here, the definition of the "job" is given. Namely, the unit of calculation demanded from a user is called the job. Each job contains several programs which are to be consecutively executed and which are exemplified by those edited from a program written in high-level language, those complied, or those complied to be executed. Those respective programs are divided and executed in such units as are managed and controlled by the operating system. These units are called job step tasks. Nevertheless, in the LCMP system, a job has to be executed by an identical processor from the beginning to the end. Therefore, in one job, for example, it is impossible to execute one job step task by the global processor 1 and the other job step task by the local processors 2. By making use of the fact that a procesor and an I/O device can be processed in parallel, on the otherhand, the operating system can simultaneously feed a plurality of jobs thereto and process them in parallel. This number of the jobs being processed in parallel is called the multiplicity of the jobs. The prior art thus far described should be referred to "The Logical Design of Operating Systems, Prentice-Hall ('74)" by Alan C. Shaw.

FIG. 2 shows the general construction of the job processing in the LCMP system. The user feeds his own job by reading it out of the card reader 3 or the like, which is connected with the global processor 1, by the use of an input reader program 24. The job thus fed constitutes an execution-waiting-JOB queue 25. During this execution waiting time, the job is stored in the drum unit 5 (as shown in FIG. 1). A job scheduler program 26 schedules the execution of the job so that it usually extracts the job in the fed order from the execution-waiting-JOB queue 25, if it is requested for the job extraction by an initiator program 27 administering the job execution of the respective processors (i.e., the global processor 1 and the local processors 2), and transfers it to the initiator program 27. After the job execution has been performed under the control of the initiator program 27, the job scheduler program 26 is informed of the termination of the job execution. At this instant, the result of the job execution is stored in the drum unit volume 5, and the job after the execution constitutes an output-waiting-JOB queue 28. Moreover, the results of the job execution are fed one by one out of the drum unit 5 to a line printer 30 or the like by the action of an output writer program 29.

In order to construct the multi processor system and to extract sufficient performance therefrom, generally speaking, the workload to be exerted upon the system has to be balancably distributed among the respective processors so that the respective processors may utilize their maximum capacity. Nevertheless, in the conventional system, as has been described above, upon request of the job extraction from the initiator program 27 of each processor, the job is scheduled in accordance with the number of the predesignated initiator tasks 27 independently of the actual workload of the TSS job of the processor under consideration. In order to cope with the fluctuations (e.g., the abrupt changes in the active TSS terminals) in the workloads upon the respective processors, therefore, the operator has to change the number of the initiator programs each time to make proper the workloads upon the processors. If the number of the initiator programs is improper, however, the operator is not informed before the instant when the processing capacities of the processors are substantially lessened so that the operator fails to timely control the proper number of the initiator programs. Therefore, it is difficult to control the processing capacity of the processors to their maximum.

In order to solve this, there can be conceived a method by which the time period of the central processing unit in the processor being not idle is dynamically controlled in view of the utilization of only the processor. The defect concomitant with this method will be described in the following. Specifically, if the utilization of the processor is high, it can be generally said that the processing capacity is high. On the contrary, notwithstanding, that the utilization is low, it cannot be concluded that the processing capacity is low. The utilization of the I/O device has to be taken into consideration. A representative of the I/O device is the drum unit 5 of FIG. 1. In the actual computer system, however, an I/O device such as a plurality of disc devices (although not shown) are independently connected with the respective processors. Generally speaking, this is partly because the processors and the I/O devices, and the I/O devices can operate in parallel and partly because, even if the utilization of the processors is low, the cause therefore is divided into the following two items:

(1) Most of the jobs simultaneously use different I/O devices, and few jobs use the processors; and (2) Although many jobs use an identical I/O device, the processings at the processors do not advance, unless that I/O device is used, advance which cannot occur until the other jobs have finished using that I/O device.

The aforementioned items (1) and (2) have absolutely different progress rates of processing. More specifically, the item (1) smoothly progresses in single processing by the job so that its processing time is shorter than that of the item (2). Therefore, when the magnitude of the workload is judged exclusively in view of the utilization of the processors, it is conceivable that a large error takes place.

As has been described hereinbefore, in case the multiplicity of jobs is to be controlled so that the workloads upon the processor is of the proper magnitude, it is understandable that the magnitudes of those workloads are not dependent only upon the utilization of the processors (i.e., the used time of the processors). Consequently, the control of the multiplicity of the job being executed only on the basis of the utilization of the processors would not maximize the processing capacities of the processors.

This applies not only to the multi processor system but also the system composed of a single processor.

SUMMARY OF THE INVENTION

It is, therefore, an object of the present invention to provide a method of dynamically controlling the multiplicity of jobs being executed so that the processing capacity of a processor may reach its maximum thereby to shorten the average processing time of a job.

The present invention is characterized in that the actual workloads upon respective processors are periodically determined in view of the utilization of the processors and I/O devices so that the multiplicity of the job being executed may be dynamically controlled.

BRIEF DESCRIPTION OF THE DRAWINGS

FIG. 4 is a diagram showing the layout of a virtual storage according to the present invention;

FIG. 5 is a flow chart showing the workload measurement processing at the start of the job execution;

FIG. 6 is a flow chart showing the workload measurement processing at the start of the job step;

FIG. 7 is a flow chart showing the workload measurement processing upon the swap-out;

FIG. 8 is a flow chart showing the workload measurement processing at the start of the I/O processing;

FIG. 17 shows the workload data calculated on the basis of FIG. 16; and

FIG. 18 shows the data to be used for the job scheduling.

DESCRIPTION OF THE PREFERRED EMBODIMENT

Definition of Workload Data

Figure 1:
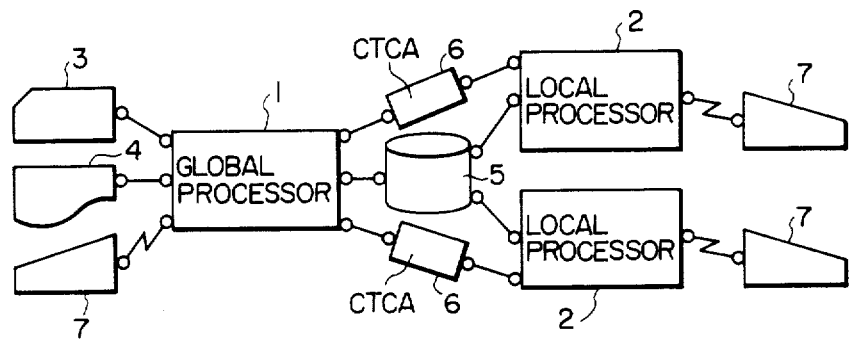
FIG. 1 is a block diagram showing the construction of an LCMP according to the prior art.
Figure 2:
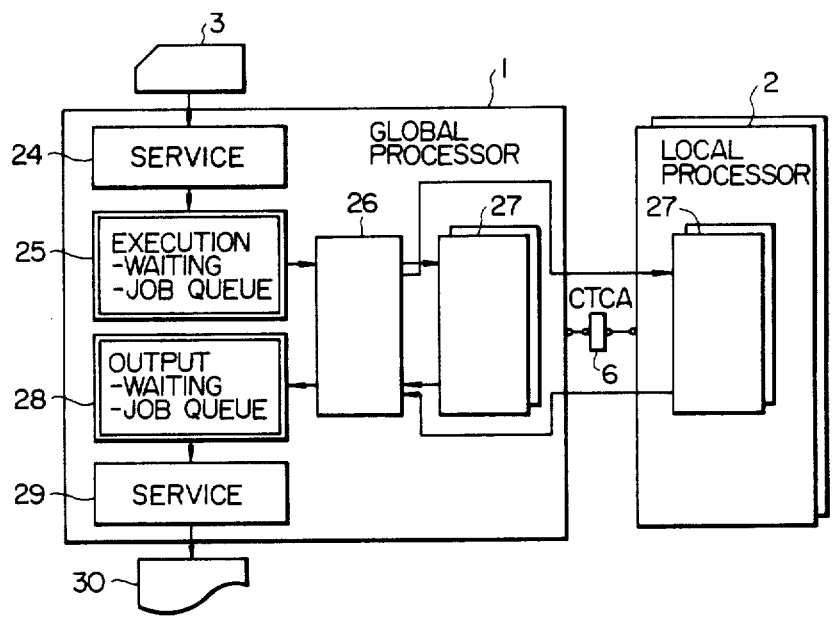
FIG. 2 is a block diagram showing an electronic computer system having the conventional LCMP construction.

The average progress rate coefficient of a job and the throughput coefficient are measured as a workload data at a predetermined time interval. The progress rate coefficient of a job i, the average progress rate coefficient of the job, and the throughput coefficient at an interval are defined by the following Equations:

$$\text{The Progress Rate Coefficient of the Job } i = \frac{CPU_i + IO_i}{ESTIME_i} \quad (1)$$

wherein:

$CPU_i$: the CPU (Central Processing Unit) processing time of the job i at that interval;

$IO_i$: the I/O processing time of the job i at that interval; and $ESTIME_i$: the elapse time of the job i at that interval (The start and end points of the elapse time are equal to those of the interval so long as said job does not start/end midway within the interval, and the elapse time is equal to the interval. When the job starts midway in the interval, the start point of the elapse time is equal to that start point. When the job ends midway within the interval, the end point of the elapse time is selected to be equal to that end time. Nevertheless, in the case where the "long wait status" of the job takes place due to the wait for the input from the terminal, it is not counted in the elapse time.

$$\text{The average progress rate coefficient of the job} = \sum_{i=1}^{N} \frac{ESTIME_i}{\sum_{i=1}^{N} ESTIME_i} \times \quad (2)$$

(Progress Rate Coefficient of Job i)

wherein: N: the multiplicity of the job execution at said interval.

$$\text{The throughput coefficient} = \frac{CPU_i + IO_i}{\text{Interval Length}} \quad (3)$$

According to the above-specified definitions, the progress rate coefficient of the job i is interpreted to express the ratio of the progress of the job i while a plurality of jobs are being executed in parallel to the progress rate (which is equal to 1) of the job i while the job i is being solely executed without the long wait status, i.e., while either the CPU processing or the I/O processing is being performed through a certain elapse time. If the plural jobs are simultaneously executed, the waits for the CPU and I/O processings take place as a result of the concurrence among the jobs so that the aforementioned ratio generally becomes smaller than 1. The average progress rate coefficient of the job is the weighted average of the progress rate coefficients of the respective jobs by the elapse time ESTIME. Here, the overlap between the CPU and I/O processings in each job is assumed negligible. On the other hand, the throughput coefficient is interpreted to express the ratio of the throughput of the processor while a plurality of jobs are being executed in parallel to the throughput (or the processed quantity equal 1) of the processor while a certain job is solely executed without the long wait status, i.e., while either the CPU processing or the I/O processing is being performed through a certain elapse time. If the plural jobs are simultaneously executed, an overlap takes place between the CPU and I/O processings of the jobs so that the aforementioned ratio generally becomes larger than 1.

As is apparent from the foregoing definitions, the progress rate coefficient of the job i is equal to the sum of the utilization ($CPU_i/ESTIME_i$) for the CPU by each job and the utilization ($IO_i/ESTIME_i$) for the I/O device by each job and is interpreted to be the net utilization of the job i. Therefore, the average progress rate coefficient is interpreted to be an average of the net utilization of each job, especially an effective average weight by the elapse time $ESTIME_i$ and the throughput coefficient is interpreted to be the total of the net utilizations of the respective jobs.

Construction of Program

Figure 3:
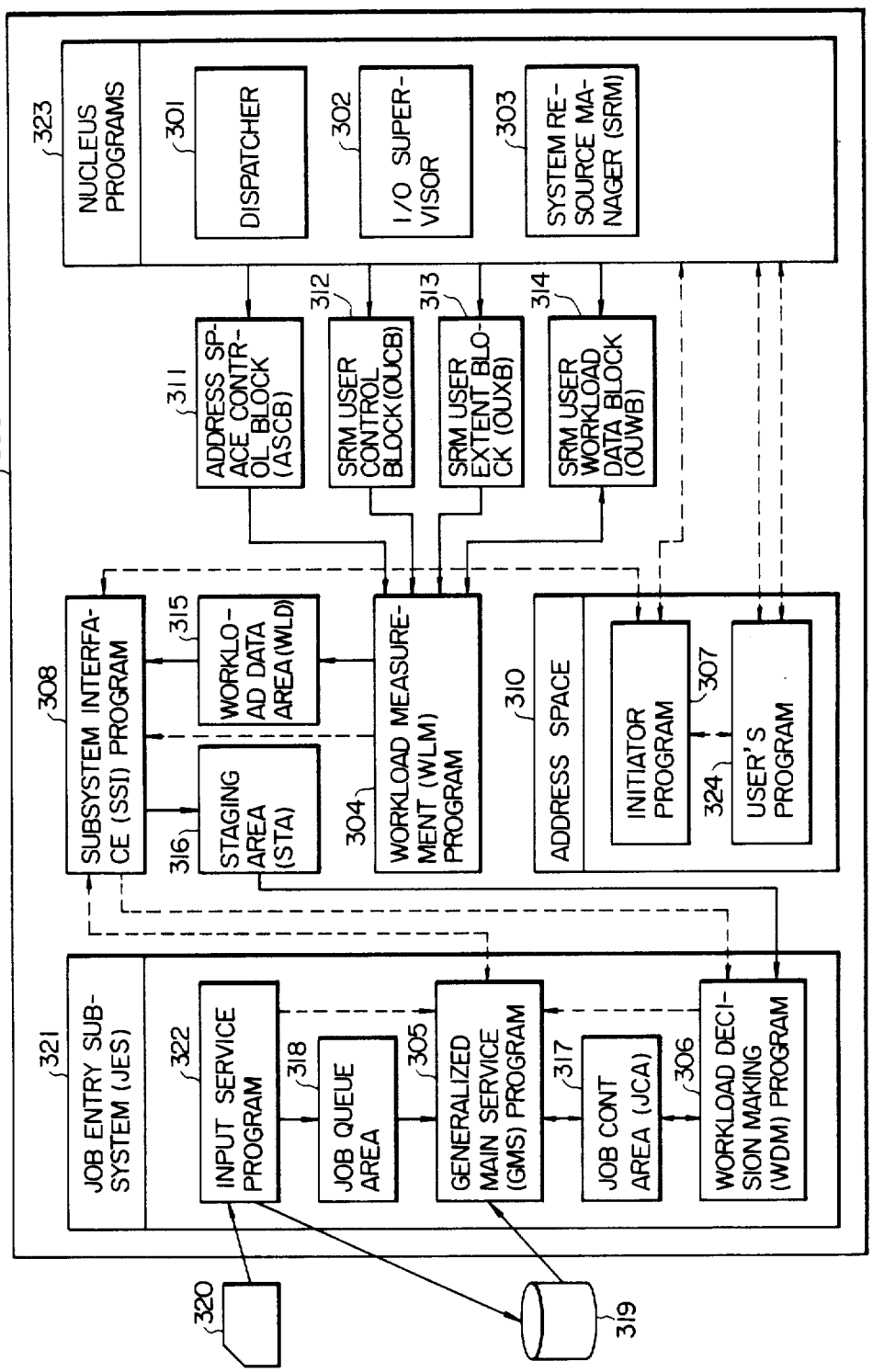
FIG. 3 is a diagram showing an example of the present invention.

FIG. 3 shows the control program relating to the execution schedule of the jobs of the global processor 1. Incidentally, all the programs excepting JES 321 exist in the local processors 2. The Figure displays the control program which is used to practice the present invention and which is divided in accordance with functions. In the Figure, solid lines and broken lines respectively indicate the flows of data and control signals. On the other hand, FIG. 4 shows the layout of a virtual storage. The following description is based upon the technical terms which are used by IBM Corporation. Reference is made to the following manuals of IBM Corporation. FIG. 4 is based upon the general Operating System (OS) of large-sized computers adopting the MVS (Multiple Virtual Storage system (Ref. 4).

(1) OS/VS2 System Initialization Logic (1974)
(2) OS/VS2 System Logic Library (6 vols) (1976)
(3) OS/VS2 JES 3 Logic (1975)
(4) OS/VS2 MVS Overview (1978)
(5) OS/VS2 System Programming Library: Debugging Handbook (1975)
(6) OS/VS2 System Programming Library: JES 3 Debugging Guide (1975)
(7) OS/VS2 SAM Logic The global processor 1 and the local processors 2 will be expressed hereinafter merely as "GP" and "LP", respectively.

Construction of Virtual Storage

The positioning of the programs according to the present invention in the virtual storage will be described with reference to FIGS. 3 and 4. A dispatcher 301, an SRM (System Resonance Manager) 303 and an I/O supervisor 302 operate as the parts of the nucleus 401 in the system area 410 (as shown in FIG. 4) of each of GP and LP (Ref. 4). A workload measurement program WLM 304 operate as the part of the address space 407 (as shown in FIG. 4) of each of GP and LP. A GMS (Generalized Main Service) 305 and a workload decision making program WDM 306 operate in a JES (Job Entry Subsystem) space 406 (as shown in FIG. 4) which is one of the address spaces of GP (Ref. 3). A plurality of initiators 307 usually exist in each of GP and LP and operate in each of address spaces 408 (as shown in FIG. 4) (Ref. 2). Moreover, a group of SSI (Subsystem Interface) programs making possible the communications between the JES and the address spaces other than the JES are placed in the LPA (Link Pack Area) 403 (as shown in FIG. 4) of the common area 412 of two processors (Refs. 2 and 3).

The ASCB (Address Space Control Block) 311, OUCB (SRM User Control Block) 312 and OUXB (SRM User Extension Block) 313, which are used to control an address space 405 (as shown in FIG. 4) by the SRM 303 and the dispatcher 301, are placed in the SQA (System Queue Area) 404 (as shown in FIG. 4) of the common area 412 corresponding to the address space (Ref. 2). An area OUWB (SRM User Workload Data Block) 314 for the workload data interchange by the WLM 304 and the SRM 303 are also placed in the SQA 404 (as shown in FIG. 4) of each processor. The WLM 304 uses the OUWB 314 to calculate the progress rate coefficient and the throughput coefficient, and an area WLD (Workload Data Area) 315 for storing those results exists in the WLM space 407. An area STA (Staging Area) 316 for reception of the workload data from the WLM 304 by the WDM 306 is placed in the CSA (Common Service Area) 402 (as shown in FIG. 4) of the common area 412 and has the job execution controlling area in the JCA (Job Control Area) 317 of the JES space.

Figure 15:
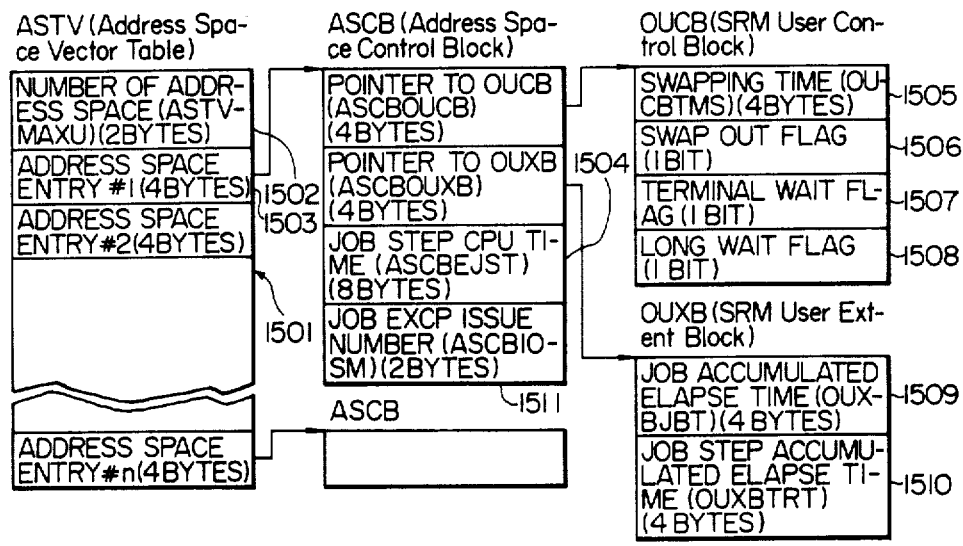
FIG. 15 shows the conventional workload data to be used by the operating system.
Figure 16:
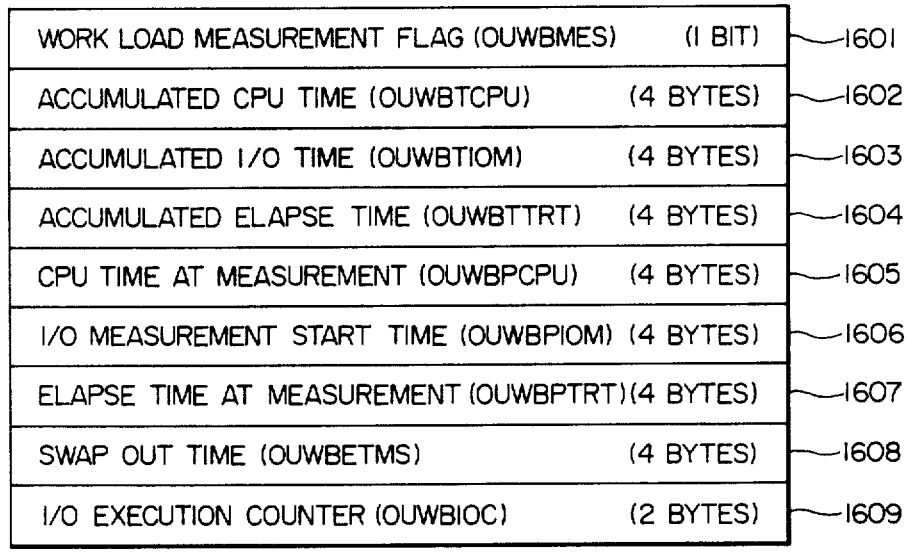
FIG. 16 shows the workload data to be measured in the present invention.

The details of the data areas of the ASCB, and OUCB and OUXB are described in Reference 4, and some of them to be referred to later are shown in FIG. 15. The details of the OUWB, WLD and JCA are shown in FIGS. 16, 17 and 18, respectively. Incidentally, the detail of the STA is described in Reference 5, and some of them to be referred later have the same type of the WLD.

Summary of Operations of Embodiment

Before entering into the detailed description of the present invention, the summary of the procedures of processing jobs in the conventional operating system will be described.

Although the construction of the virtual storage immediately after the initialization of the system has been complete has been described with reference to FIG. 4, the number of initiator spaces 310 is usually determined by the manager of a computer center, and the initiator spaces 310 themselves are formed by the SRM 303 in response to the command generated by a JES 321. At this time, the ASCB 311 and the OUCB are prepared by the SRM 303 in a manner to correspond to those spaces, and the address of the ASCB is set in an address space vector table ASVT 150 (as shown in FIG. 15). More specifically, the most lefthand bit of the whole entry (i.e., 4 byte-entry) of the ASVT is "ON" during the initialization of the system. However, each time the address space is formed by the SRM, the most lefthand bit from the leading entry is checked. For ON, the address of the ASCB, which has been prepared at the three righthand bytes of that entry, is set, and the most lefthand bit of the same entry is reset. The construction at that time is shown in FIG. 15. When the initiator 307 is started, a request for job extractions is fed through the SSI 308 to the GMS 305. If a job is already registered in job queues 318 and 319, the GMS feeds the data relating to the job to the initiator 307 through the SSI 308. The initiator 307 informs, when it gets the job, the SRM 303 of the fact that the job selection has been succeeded by the use of a SVC (Supervisor Call) instruction SYSEVENT JŌBSELCT. In response to this, the SRM 303 initializes the ASCB 311 and OUCB 312 corresponding to that address space 310. Moreover, the initiator uses the data in the job queue generates a job step task so as to operate a user's program 324 and effects the 0 clearance of the job step CPU time ASCBEJST 1504 in the ASCB 311 so that it informs the SRM of that fact by the use of the SVC instruction SYSEVENT INITATT. At this time, the SRM generates the SRM user extent block OUXB 313 and initializes the OUXB by the use of the SRM internal data (although not displayed). Specifically, the SRM effects the 0 clearance of a job step accumulated elapse time OUXBTRT 1510 and the restoration of the content of a job accumulated elapse time OUXBJBT 1509 from the SRM internal data. Moreover the SRM sets the swapping time OUCBTMS 1505 in the OUCB at the present time.

On the other hand, if there is a report of the end of the job step from the user's program 324, the initiator informs the SRM of that fact by the use of the SVC instruction SYSEVENT INITDET. The SRM adds the value of the job step accumulated elapse time OUXBTRT 1510 to the job accumulated elapse time OUXBJBT 1509 and temporarily stores the content of the OUXB 313 at that time in the SRM internal data area thereby to extinguish the OUXB.

When the job is ended, the initiator 307 informs the GMS 305 of that fact through the SSI 308 and further informs the SRM 303 by the use of the SVC instruction SYSEVENT JOBTERM. At this time, the GMS deletes said job from the job queues 318 and 319. On the other hand, the SRM 303 makes ineffective the data in the ASCB 311 and OUCB 312 of the address space 310 corresponding to said job. After that, the initiator 307 sends again the request for job extraction demand to the GMS 305 through the SSI 308. If the job exists in the job queues 318 and 319, it is transferred to the initiator 307, as has been described hereinbefore. On the contrary, if no job exists in the job queues 318 and 319, that request is reserved, and the initiator 307 waits for the answer from the GMS 305. If the input service 322 in the JES 321 registers a job 320 in the job queues 318 and 319, the GMS 305 in the JES 321 transfers the job in response to the reserved request drum unit from the initiator 307. The subsequent processing procedures are as has been described hereinbefore.

Incidentally, the input service 322 performs the input processing of the job so that it reads the job out of the card reader 320 or the like and stores it in the job queue 319 of the SPOOL volume 5 (as shown in FIG. 1) so that it may be subsequently executed. At the same time, the input service 322 instructs the operation of the GMS 305 after the job has been registered in the job queue area 318 of the virtual storage. The job queue area 318 stores all the input jobs as to the job names, the job owners, the job statuses (whether the jobs wait for their executions, are being executed or wait for their outputs) and so on. The job names and the job owners are designated by the user when the jobs are fed in.

During the time period from the start to the end of the job step, the workload data are renewed by the SRM 303 and the dispatcher 301. The job step CPU times ASCBEJST are calculated one by one by the dispatcher 301 as to the time period from the instant when their task receives the control of the CPU to the instant when the task is released from the control of the CPU, and that time period is added. On the other hand, the elapse time OUXBTRT 1510 (as shown in FIG. 15) in the OUXB 313 is cleared to zero when the INITATT SYSEVENT or the SVC instruction for starting the job step is generated by the initiator 307. At this time, the present time is stored in the swapping time OUCBTMS 1505 (as shown in FIG. 15) of the OUCB 312. On the contrary, when the address space 310 is swapped out by the SRM 303, the value, which is calculated by subtracting the value of the swapping time OUCBTMS 1505 from that time, is added to the job step elapse time OUXBTRT 1510, and the resultant time is stored in the swapping time OUCBTMS 1505 so that a swap out flag 1506 (as shown in FIG. 15) in the OUCB is set. On the other hand, the setting method of the OUCBTMS when the address space 310 is swapped in is the same. When the address space 310 is swapped out either for a long period or for waiting for terminals, not the renewal of the job step elapse time OUXBTRT 1510 but only the swapping time OUCBTMS 1505 is performed, and the long wait flag 1508 (as shown in FIG. 15) and terminal wait flag 1507 (as shown in FIG. 15) in the OUCB 312 are set.

The description thus far made should be referred to References 1 to 5.

The summary of the operations of the present invention will be described hereinafter:

The workload data ASCB 311, OUCB 312, OUXB 313 and OUWB 314 (which are prepared at the initial time of the system) belonging to the SRM 303, dispatcher 301 and I/O supervisor 302 are periodically monitored by the WLM 304, and the average progress rate coefficient and the throughput coefficient are calculated on the basis of those data and are stored in the WLD 315. Then, the WLM 304 temporarily stores the content of the WLD 315 in the STA 316 through the SSI 308. This SSI 308 informs the JES 321 of the fact that the data are placed in the STA 316 by the use of the POST SVC instruction. The JES 321 transfers the data to the WDM 306 so that the job processing multiplicty may be decided. The WDM 306 places the decided result in the JCA 317 and transfers the control to the GMS 305. At this time, if the initiator 307 is in its job execution demand reserving status and if the decided result indicates that the multiplicity is increased, the GMS 305 transfers the job to its initiator 307. On the contrary, in case the multiplicity is to be decreased, the subsequent execution demand of the initiator 307 is reserved.

The details of the operations of the respective programs will be described in the following.

Operating Method of SRM and I/O Supervisor

The SRM 303, I/O supervisor 302 and dispatcher 301 control the executions of jobs and are informed of the following event, if any, thereby to collect the data necessary for calculating the workload data. (Reference should be made to FIGS. 5 to 12.)

(1) Start of Job Execution
(2) Swap-out of Job
(3) Start/End of I/O Processing
(4) Start/End of Job Step Execution In the Case of the Start of the Job Execution When the SRM 303 (as shown in FIG. 3) is informed of the start of the job execution from the initiator 307 (as shown in FIG. 3) (as has been described hereinbefore), it stores the data necessary for calculating the workload data in the OUWB 314 (as shown in FIG. 3) (which is shown in detail in FIG. 16) corresponding to its address space. This will be described with reference to FIG. 5. (501): Search OUWB corresponding to Address Space. (502): Zero-Clear Accumulated CPU Time OUWBT-CPU 1602 (as shown in FIG. 16), Accumulated I/O Time OUWBTIOM 1603 (as shown in FIG. 16) and Accumulated Elapse time OUWBTTRT 1604 (as shown in FIG. 16). (503): Store the value of Present CPU Time ASCBEJST 1504 (as shown in FIG. 15) in CPU Time OUWBPCPU 1606 (as shown in FIG. 16) upon Measurement. (504): Zero-Clear I/O Measurement Start Time OUWBTIOM and Elapse Time OUWBPTRT 1607 (as shown in FIG. 16) upon Measurement. (505): Zero-Clear I/O Execution Counter OUWBIOC 1609 (as shown in FIG. 16). (506): Set Workload Measurement Flag OUWBMES 1601 (as shown in FIG. 16).

At the Start of the Job Step

When the SRM 303 (as shown in FIG. 3) is informed the start of the job step from the initiator 307 (as shown in FIG. 3) (as has been described hereinbefore), as shown in FIG. 6, (601): Search OUWB Corresponding to Address Space; and (602): The SRM 303 sets the value (usually at 0) of the CPU time ASCBEJST 1504 in OUWBPCPU 1605.

In the Case of the Swap-out of the Job

When the address space corresponding to the job is swapped out by the SRM 303 (as shown in FIG. 3) (upon issuing of SYSEVENT QSCECMP), the data corresponding to that address space takes refuge in the OUWB inside of the SRM 303. This will be described with reference to FIG. 7. (701): Search OUWB. (702): Set Accumulated Elapse Time in the OUWBTTRT 1604. (703): Set Elapse Time upon Measurement in the OUWBPTRT 1607. The calculating equations at this time will be written in the following:

OUWBTTRT←(Present
Time)−(OUCBTMS)+(OUWBTTRT)-
+(OUXBJBT)+(OUXBTRT)−(OUWBPTRT);
and OUWBPTRT←(Present
Time)−(OUCBTMS)+(OUXBJBT)-
+(OUXBTRT).

(704): Set Swapping Measurement Time OUWBETMS 1608 (as shown in FIG. 16) at Present Time.

At the Start of I/O Processing

The operations when the I/O processing is started will be described with reference to FIG. 8. (801): The I/O supervisor 302 (as shown in FIG. 3) issues an SIO (Start I/O) instruction so as to effect the input/output relating that job. When the result succeeds, (802): Search the OUWB, and (803): perform the Following Processings. (804): In case the I/O execution counter OUWBIOC 1609 (as shown in FIG. 16) is 0, (805): the present time is set in the I/O measurement initiation time OUWBPIOM 1606. (806): The I/O execution counter OUWBIOC 1609 is counted up (+1).

In case the measurement of the I/O time has been started (i.e., in case the I/O execution counter OUWBIOC 1609 is not 0), the I/O execution counter OUWBIOC 1609 is only counted up (+1).

At the end of the I/O processing

When the I/O processing ends, the control is transferred as an interruption to the I/O supervisor 302 (as shown in FIG. 3). This will be described with reference to FIG. 9.

(902): The I/O execution counter OUWBIOC 1609 is counted down (−1).

(903): The I/O execution counter OUWBIOC 1609 is checked.

(904): In case the I/O execution counter OUWBIOC 1609 is at 0, the difference between the present time and the I/O time measurement start time OUWBPIOM 1606 is added to the accumulated I/O time OUWBTIOM 1603. The calculating equations at this time will be written in the following:

OUWBTIOM←(Present
Time)−(OUWBPIOM)+(OUWBTIOM)

In case there is the input/output being executed (i.e., in case the I/O execution counter OUWBIOC 1609 has a higher value than 0), no renewal is performed.

At the end of the job step

Figure 10:
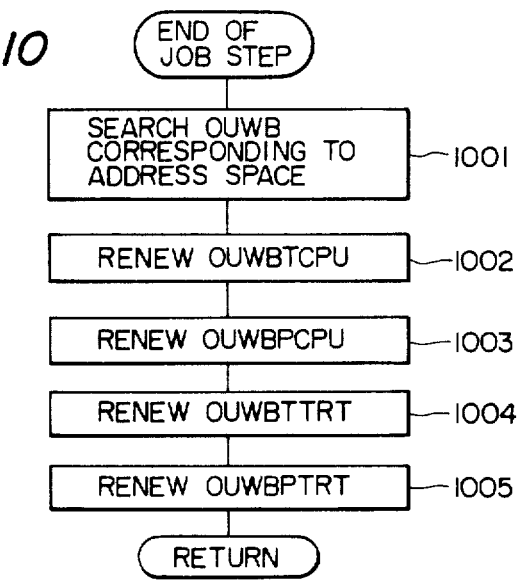
FIG. 10 is a flow chart showing the workload measurement at the end of the job step.

If the SRM 303 (as shown in FIG. 3) is informed of the end of the job step from the initiator 307 (as shown in FIG. 3) (as has been described hereinbefore), the CPU time and the elapse time are made to take refuge in the manners shown in FIG. 10.

(1002): The accumulated CPU time OUWBTCPU 1602 is calculated by the following equation:

OUWBTCPU←(ASCBEJST)−(OUWBPCPU)+-
(OUWBTCPU).

(1003): The value of the ASCBEJST 1504 is set in the CPU time OUWBPCPU 1605 upon measurement. (1004): The accumulated elapse time OUWBTTRT 1604 is calculated by the same equation as that in case the job is swapped out, and (1005): the elapse time OUWBPTRT 1607 upon measurement is similarly calculated.

The description thus far made is the explanation of the operations in case a variety of events take place in the SRM 303 (as shown in FIG. 3) and the I/O supervisor 302.

Explanation of Operations of Workload Meaurement Program

The operations of the workload measurement program WLM 304 (as shown in FIG. 3) which is started at each measurement interval will be described in the following.

The Processing at the Start

After the system initialization, the WLM 304 is started at an arbitrary time by a command. This will be described with reference to FIG. 11.

(1101): The index of the address space is set to 1;

(1102) The OUWB corresponding to the index is searched;

(1103): The accumulated CPU time OUWBTCPU 1602 (as shown in FIG. 16), accumulated I/O time OUWBTIOM 1603 (as shown in FIG. 16) and accumulated elapse time OUWBTTRT 1604 (as shown in FIG. 16) are zero-cleared;

(1104): Whether the lefthand first bit of the corresponding entry in the Address Space Vector Table ASVT 1501 (as shown in FIG. 15) in the SQA 404 (as shown in FIG. 4) is at 0 or not (i.e., whether the address space is active or not) is checked;

(1105): The present CPU time ASCBEJST 1504 in the ASCB is set in the CPU time OUWBPCPU 1605 upon measurement, and the present time is set in the I/O measurement start time OUWBPIOM 1606; and (1106): The elapse time OUWBPTRT 1607 upon measurement is calculated by the following method:

(i) When the address space is swapped in (i.e., when when the swap-out flag in the OUCB is OFF):

$$OUWBPTRT = (Present\ Time) - (Swap\text{-}in\ Time\ OUCBTMS) + (Job\ Accumulated\ Elapse\ Time\ OUXBJBT) + (Job\ Step\ Accumulated\ Elapse\ Time\ OUXBTRT);$$

(ii) When the address space is swapped out but not for a long time period (i.e., when the swap-out flag in the OUCB is ON but the long wait flag is OFF):

$$OUWBPTRT = (Present\ Time) - (Swap\text{-}out\ Measurement\ Time\ OUWBETMS) + (Elapse\ Time\ OUWBPTRT\ upon\ Measurement);$$

(iii) When the address space is swapped out for a long time period (i.e., when both the swap-out flag and long wait flag in the OUCB are ON): the renewal of the OUWBPTRT 1607 is not performed.

(1108): When the address space is not active (i.e., when the lefthand 1 bit of the corresponding entry in the ASVT is ON), the workload measurement flag OUWBMES 1601 is reset;

(1107): The index is counted up (+1); and (1109): The workload measurement program is ended if the value of the index exceeds the maximum number ASVTMAXU 1502 of the address space in the ASVT 1501, and the processings thus far described are repeated if the same fails to exceed.

The operations at the Measurement Interval Elapse Time

Figure 12A:
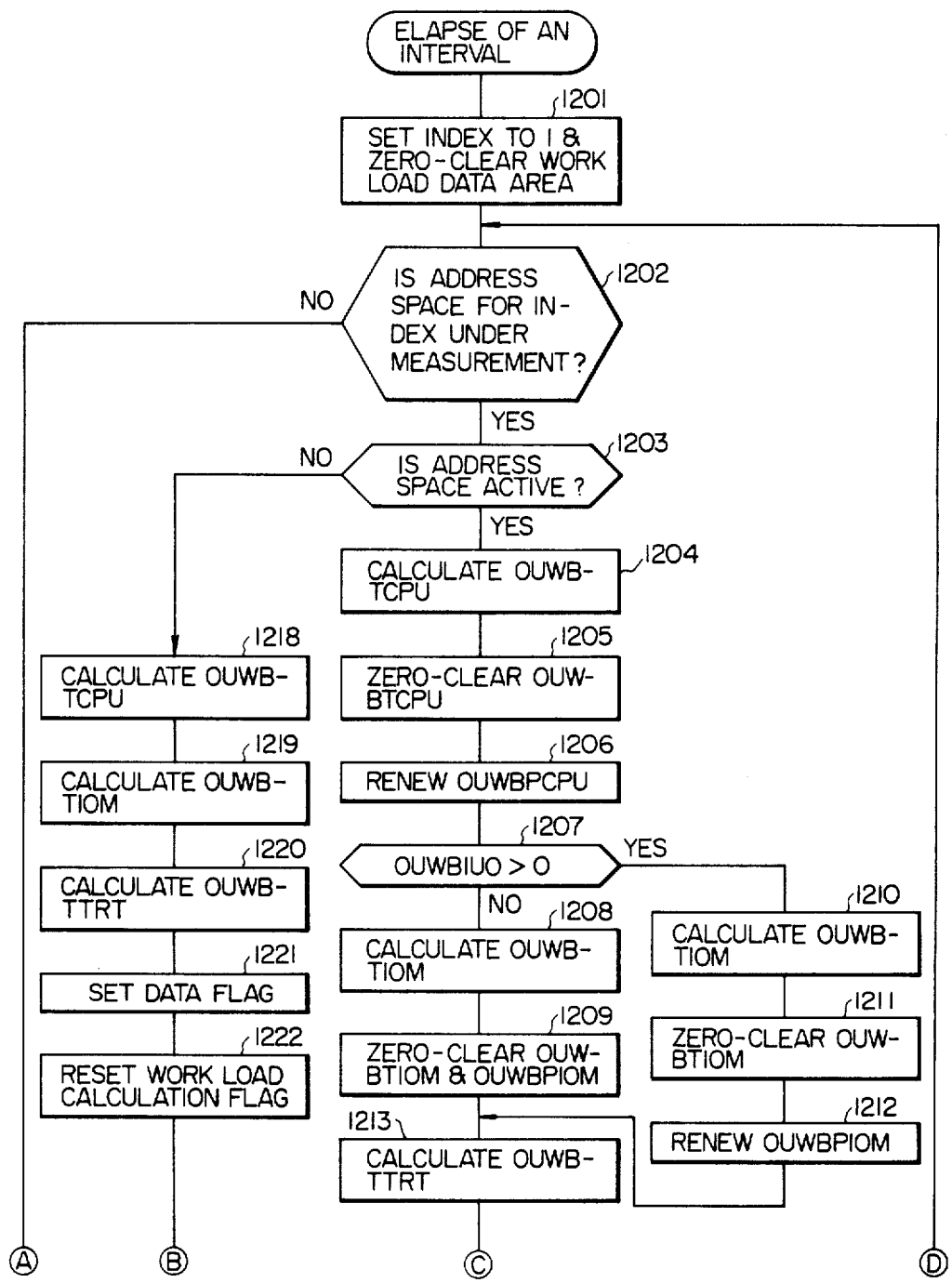
FIG. 12 is a flow chart showing the workload calculating processing after elapse of the measurement interval.
Figure 12B:
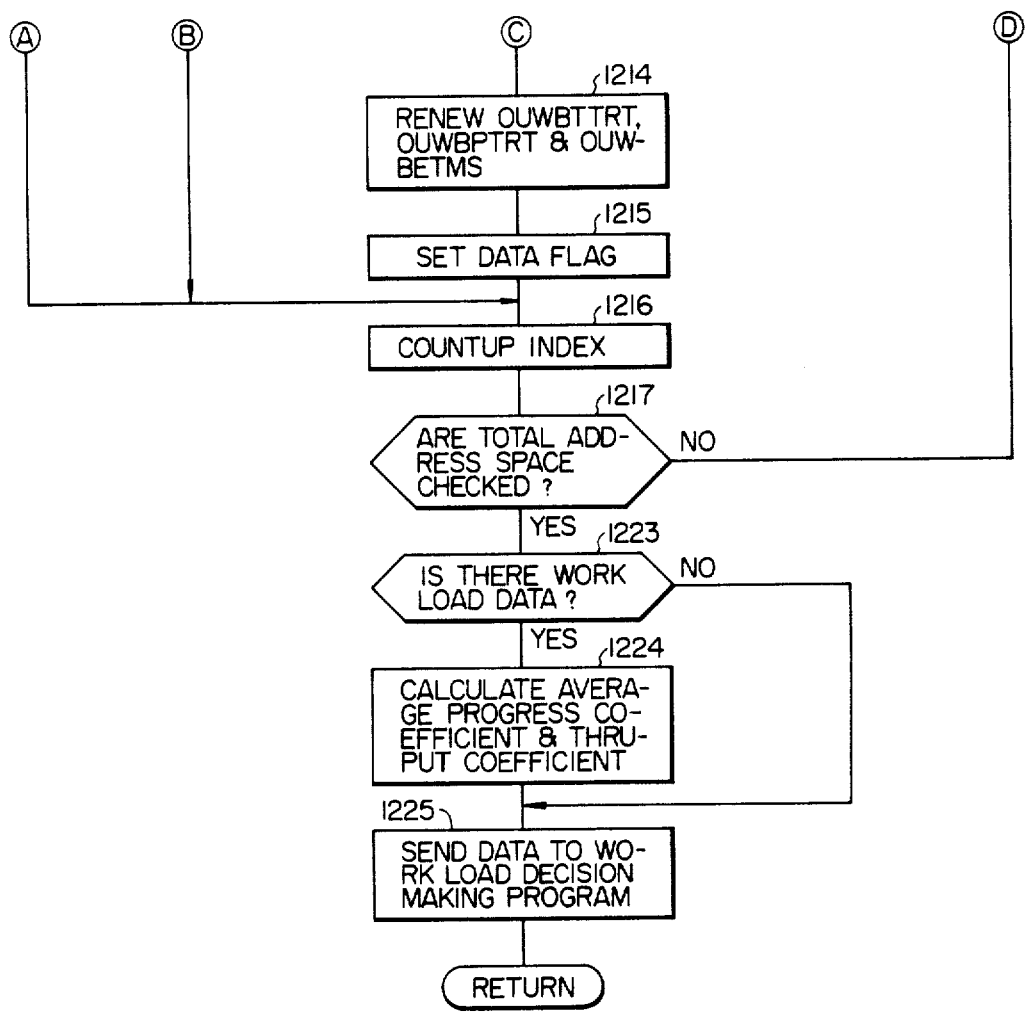

The operations of the processing of the WLM 304 to be performed at each measurement interval will now be described with reference to FIG. 12.

(1201): The index is set at 1, and the workload data area WLD (as shown in FIG. 17) is zero-cleared. At this time, the data flag 1706 in the WLD is reset, too;

(1202): The OUWB corresponding to the index is decided to check whether the workload measurement flag OUWBMES 1601 (as shown in FIG. 16) is ON or not;

(1203): If it is during the workload measurement (i.e., if the OUWBMES is ON), whether the address space is active or not (i.e., whether the most lefthand 1 bit of the entry to be pointed by the index in the Address Space Vector Table 1502 (as shown in FIG. 15 is OFF or not) is checked;

(1204): If the address space is active, the value of the accumulated CPU time OUWBTCPU 1602 is added to the total accumulated CPU time WLDCPU 1701 (as shown in FIG. 17);

(1205): The accumulated CPU time OUWBTCPU 1602 is zero-cleared;

(1206): The value of the job step CPU time ASCBEJST 1504 (as shown in FIG. 15) in the ASCB is set in the CPU time OUWBPCPU 1605 upon measurement;

(1207): The I/O execution counter OUWBIOC 1609 is checked;

(1208): If the OUWBIOC is at 0 (i.e., if the input/output is not executed), the accumulated I/O time OUWBTIOM 1603 is added to the accumulated total I/O time WLDIOM 1702 (as shown in FIG. 17) in the WLD:

(1209): The accumulated I/O time OUWBTIOM and I/O measurement start time OUWBPIOM 1606 are zero-cleared:

(1210): Unless the I/O execution counter OUWBIOC 1609 is at 0, the accumulated total I/O time WLDIOM 1702 is calculated by the use of the following equation:

$$WLDIOM \leftarrow (Present\ Time) - (I/O\ Measurement\ Start\ Time\ OUWBPIOM) + (Accumulated\ I/O\ Time\ OUWBTIOM) + (Accumulated\ Total\ I/O\ Time\ WLDIOM);$$

(1211): The accumulated I/O time OUWBTIOM 1603 is zero-cleared;

(1212): The present time is set in the I/O measurement start time OUWBPIOM 1606;

(1213) and (1214): Notwithstanding whether it is during the I/O execution or not, the accumulated total elapse time WLDTRT 1703 is calculated by the following equations together with the renewal of the data of the elapse time:

(i) When the swap-out flag 1506 (as shown in FIG. 15) in the OUCB is OFF:

$$WLDTRT \leftarrow (Present\ Time) - (Swapping\ Time\ OUCBTMS) + (Accumulated\ Elapse\ Time\ OUWBTTRT) + (Job\ Accumulated\ Elapse\ Time\ OUXBJBT) + (Job\ Step\ Accumulated\ Elapse\ Time\ OUXBTRT) - (Elapse\ Time\ OUWBPTRT\ upon\ Measurement) + (Accumulated\ Total\ Elapse\ Time\ WLDTRT);$$

$$OUWBPTRT \leftarrow (Present\ Time) - (Swapping\ Time\ OUCBTMS) + (Job\ Accumulated\ Elapse\ Time\ OUXBJBT) + (Job\ Step\ Accumulated\ Elapse\ Time\ OUXBTRT);\ and$$

$$OUWBTTRT \leftarrow 0$$

(ii) In case the swap-out flag 1506 in the OUCB is ON but the long wait flag is OFF:

$$WLDTRT = (Present\ Time) - (Swapping\ Time\ OUWBETMS\ upon\ Measurement) + (Accumulated\ Elapse\ Time) + (Accumulated\ Total\ Elapse\ Time\ WLDTRT);$$

$$OLWBPTRT \leftarrow (Present\ Time) - (Swapping\ Time\ OUWBETMS\ upon\ Measurement) + (Elapse\ Time\ OUWBPTRT\ upon\ Measurement);$$

$$OUWBTTRT \leftarrow 0;\ and$$

$$OUWBETMS \leftarrow (Present\ Time).$$

(iii) In case both the swap-out flag 1506 and long wait flag 1508, in the OUCB are ON:

$$WLDTRT \leftarrow (Accumulated\ Elapse\ Time\ OUWBTTRT) + (Accumulated\ Total\ Elapse\ Time\ WLDTRT);\ and$$

$$OUWBTTRT \leftarrow 0$$

(1215): After all the foregoing calculations have been finished, the data flag 1706 in the WLD is set.

(1216): Then, the index is counted up (+1).

(1217): Whether the total address spaces have been checked is checked, and the processings from (1202) are repeated unless the check is finished.

On the other hand, when the address space is inactive at (1203) (i.e., when the most lefthand bit of said entry in the ASUT 1501 is ON), the processings from (1218) to (1222) are performed:

(1218): The accumulated CPU time OUWBTCPU 1602 is added to the accumulated total CPU time WLDCPU 1701;

(1219): The accumulated I/O time OUWBTIOM 1603 is added to the accumulated total I/O time WLDIOM 1702;

(1220): The accumulated elapse time OUWBTTRT 1604 is added to the accumulated total elapse time WLDTRT 1703;

(1221): The data flag 1706 in the WLD is set;

(1222): The workload measurement flag OUWBMES 1601 in the OUWB is reset;

When all the address spaces are checked, the processings after the following (1223) are performed to calculate the average progress rate coefficient and the throughput coefficient:

(1223): The data flag 1701 in the WLD is inspected to check whether there are effective workload data or not;

(1224): When the data flag is ON, the average progress rate coefficient and the throughput coefficient are calculated by the following equations and are set in the WLDAPR 1705 (as shown in FIG. 17) and the WLDTRP 1704 (as shown in FIG. 17), respectively.

$$WLDAPR = [(Accumulated\ Total\ I/O\ Time\ WLDIOM) + (Accumulated\ Total\ CPU\ Time\ WLDCPU)]/(Accumulated\ Total\ Elapse\ Time\ WLDTRT)$$

$$WLDTRP = [(Accumulated\ Total\ I/O\ Time\ WLDIOM) + (Accumulated\ Total\ CPU\ Time\ WLDCPU)]/(Measurement\ Interval\ Length)$$

(1225): The WLD 315 thus calculated is transmitted through the SSI 308 to the workload decision making program WDM 306.

On the contrary, unless there are the workload data, the WLD 315 having no value set is transmitted.

Operations of Proper Workload Decision Making Program

Figure 13:
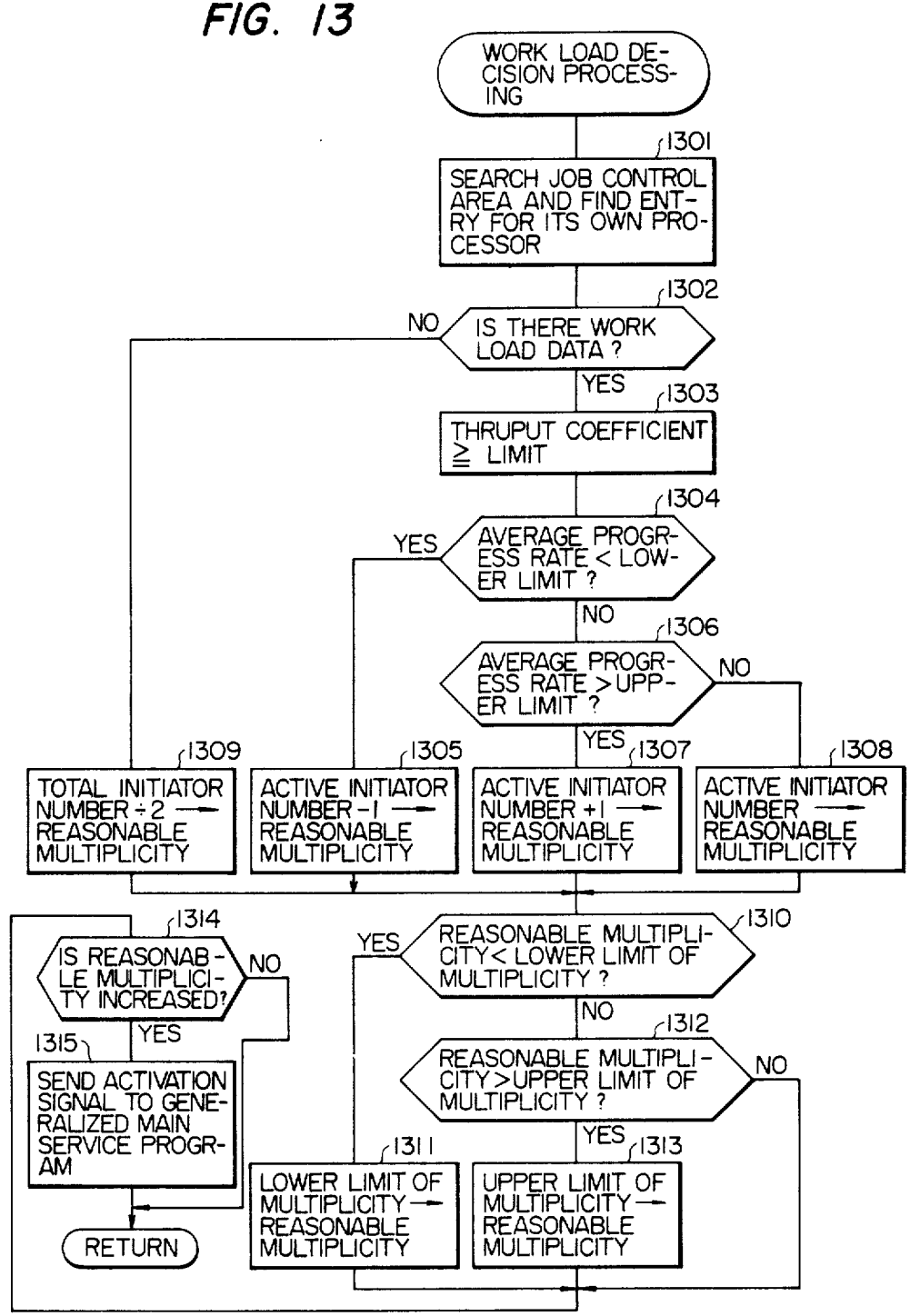
FIG. 13 is a flow chart showing the workload decision making processing.

The proper workload decision making program 306 (as shown in FIG. 3) is provided in the global processor so that it judges the propriety of the workloads upon the respective processors on the basis of the workload data, which are periodically sent from the workload measurement program 304 of the respective processors, thereby to decide the proper workload. As a means for making the workload proper, the processing multiplicity (i.e., the number of the active initiators) of the batch jobs is controlled in the present embodiment (Likewise, the processing multiplicity (i.e., the number of the active TSS terminals) of the TSS jobs can also be controlled (Reference should be made to FIG. 13.)).

(1301): The workload decision making program WDM 306 (as shown in FIG. 3) searches the job control area (which is shown in detail in FIG. 18) from the processor names (which is inserted into the STA by the SSI 308) in the workload data, which are set in the staging area STA 316 (which has the same type as that of the workload data area WLD), and finds the entry for its own processor;

(1302): Whether the average progress rate coefficient and the throughput coefficient have been calculated or not is checked at the data flag 1706 in the STA;

(1303): If those coefficients are calculated. (i.e., if the data flag 1706 is ON), whether the throughput coefficient 1704 in the STA exceeds the predetermined throughput coefficient limit 1802 (which can be designated by the user) in the JCA or not is checked.

If the throughput coefficient 1704 is smaller than the throughput limit, whether the job average progress rate coefficient 1705 in the STA is within the allowable range of the JCA or not is checked (1304 to 1309) to find out the causes for deteriorating the throughput;

(1304): Whether the job average progress rate coefficient 1705 is smaller than the lower limit of the JCA or not is checked;

(1305): If the coefficient 1705 is smaller, the number of the active initiators 1809 in the JCA is counted down (−1) and is set in the reasonable multiplicity area in the JCA;

(1306): If the job average progress rate coefficient 1705 is not smaller at (1304), whether it is larger than the upper limit 1803 in the JCA or not is further checked;

(1307): If the coefficient 1705 exceeds, the active initiator number 1809 in the JCA is counted up (+1), and the resultant value is set in the reasonable multiplicity area 1807.

(1308): Either if the coefficient 1705 fails to exceed at (1306) or if the throughput coefficient 1704 is equal to or larger than the upper limit 1802, the status is accepted as reasonable, and the active initiator number 1809 is used as it is as the reasonable multiplicity; and (1309): If the data flag 1706 in the STA is OFF at (1302), one half of the total initiator number 1808 in the JCA is used as the reasonable multiplicity.

The foregoing description is directed to a method of deciding the reasonable multiplicity 1807. This reasonable multiplicity is then modified at (1310) to (1313).

(1310): Whether the reasonable multiplicity decided is lower than the lower limit 1806 of the multiplicity in the JCA to be modified or not is checked;

(1311): If the decided multiplicity is lower, the lower limit 1806 is used as it is as the reasonable multiplicity;

(1312): Unless the decided multiplicity is lower, whether the reasonable multiplicity 1807 exceeds the upper limit 1805 of the multiplicity in the JCA to be modified or not is then checked; and (1313): If the upper limit 1805 is exceeded, it is used as the reasonable multiplicity 1807.

Thus, the reasonable multiplicity 1807 in the JCA is finally decided.

(1314): As a result, the active initiator number 1809 and the reasonable multiplicity 1807 are compared; and (1315): If the reasonable multiplicity 1807 exceeds, the GMS 305 is informed to start the initiators.

Operations of Generalized Main Service Program

The generalized main service program GMS 305 schedules the execution, of jobs so that it controls the extraction of execution waiting jobs in accordance with the reasonable multiplicity in the JCA, which has been decided in accordance with the workload decision making program WDM 306, to make the workloads upon the processors efficient.

Figure 14:
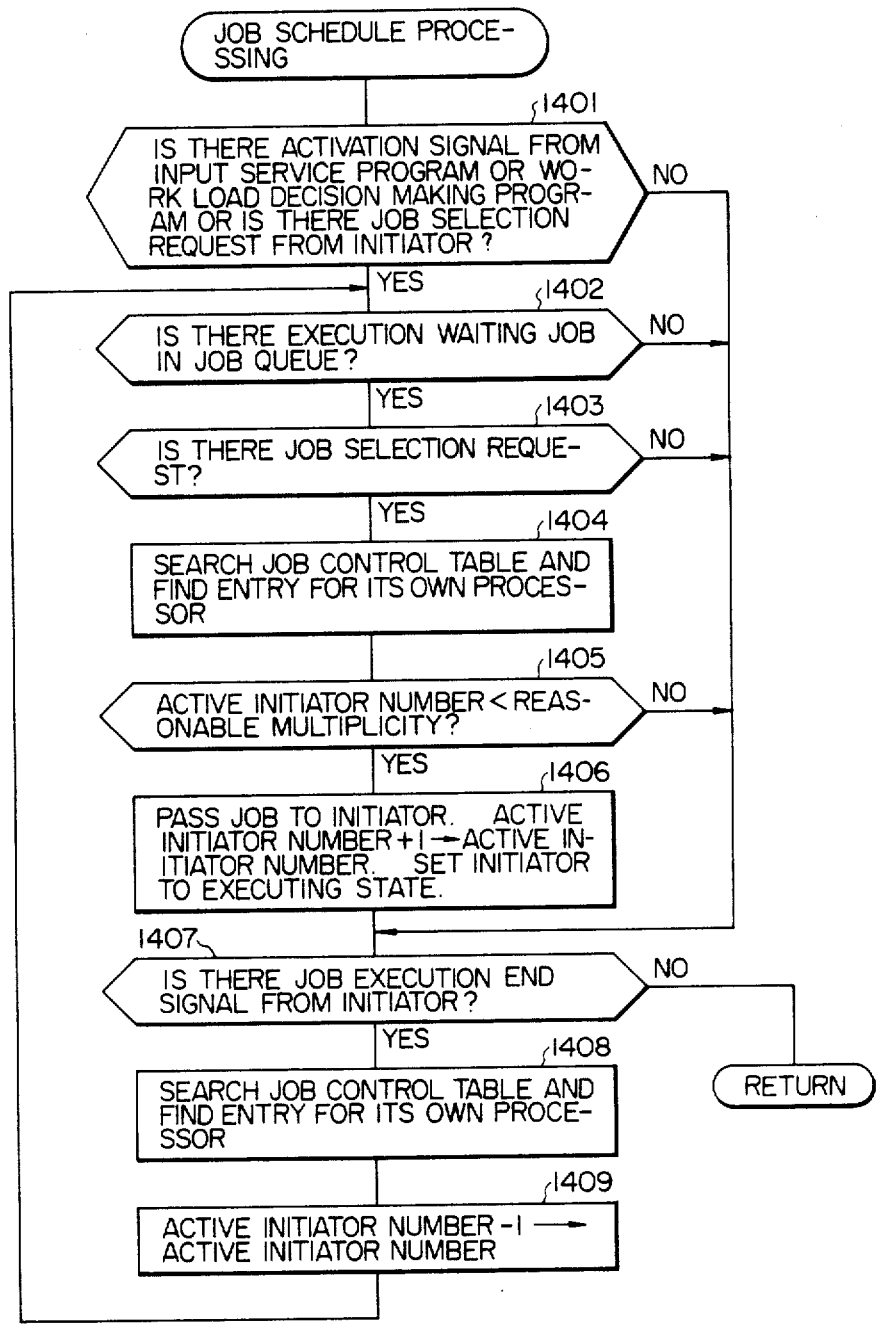
FIG. 14 is a flow chart showing the job execution schedule processing.

The GMS operates when its operation is instructed by the input service program 322 and the WDM 306 and in case the demand for extraction of the jobs and the information of the end of the job execution are made by the initiator 307. The operations will be explained in the following with reference to FIG. 14.

(1401): Whether there is an actuation signal from the input service program 322 or the workload decision making program WDM 306 or not and whether there is a job selection request from the initiator 307 or not are checked;

(1402): If any, whether there is an execution-waiting job in the job queue area 318 or not is checked;

(1403): If any, whether there is a job selection request from the initiator 307 or not is then checked;

(1404): With the request, the entry in the JCA 317, which has the same name of the processor having its initiator 307 being excecuted, is found;

(1405): At to the entry thus found, whether the active initiator number 1809 is lower than the reasonable multiplicity or not is checked; and (1406): If that initiator number 1809 is lower, the job data are passed through the SSI 308 to the initiator 307 in response to the selection request of the initiator. Moreover, the active initiator number 1809 is counted up (+1) to set the initiator to its executing state.

After the foregoing processings, the following processings are performed.

(1407): Whether there is a job execution end signal from the initiator 307 or not is checked;

Without that signal, the processings are ended.

(1408): If any, the entry concerned in the JCA 317 is found similarly to (1404); and (1409): The active initiator number 1809 is counted down (−1), and the processings subsequent to (1402) are continued.

Figure 9:
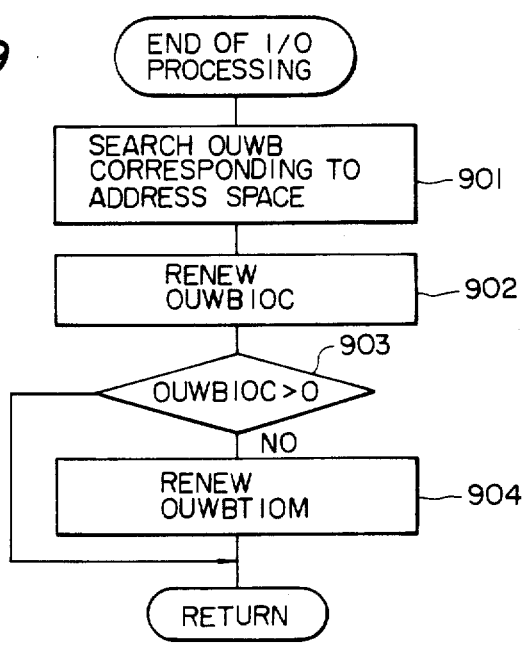
FIG. 9 is a flow chart showing the workload measurement processing at the end of the I/O processing.

Incidentally, although the I/O time is directly calculated in the present embodiment, it can also be approximately decided by the number of issues of the EXCP SVC instruction from the user, which is counted in the conventional operating system, and by the average I/O time per that instruction. The EXCP number is counted in the data management or the like of the OS/MVS and is accumulated for each address space in the ASCBIOSM 1511 (as shown in FIG. 15) of the ASCB 311 (Ref. 7). In case the EXCP number is used, the processings of FIGS. 8 and 9 are unnecessary. In place of the zero-clearance of the OUWBPIOM 1606 by the processing 504 at the processing (as shown in FIG. 5) at the start of the job execution as the SRM processing, the value of the ASCBIOSM 1511 at that time is set. In the SRM, moreover, as the processing at the end of the job execution, the accumulated EXCP number of the jobs from the preceding measurement to the present measurement is calculated by the righthand term of the following equation (These data are expressed in letters OUWBTIOM for simplificity.) and is set in the OUWBTIOM 1603 (as shown in FIG. 16).

OUWBTIOM←(ASCBIOSM 1511)−(OUWBPIOM 1606).

Figure 11:
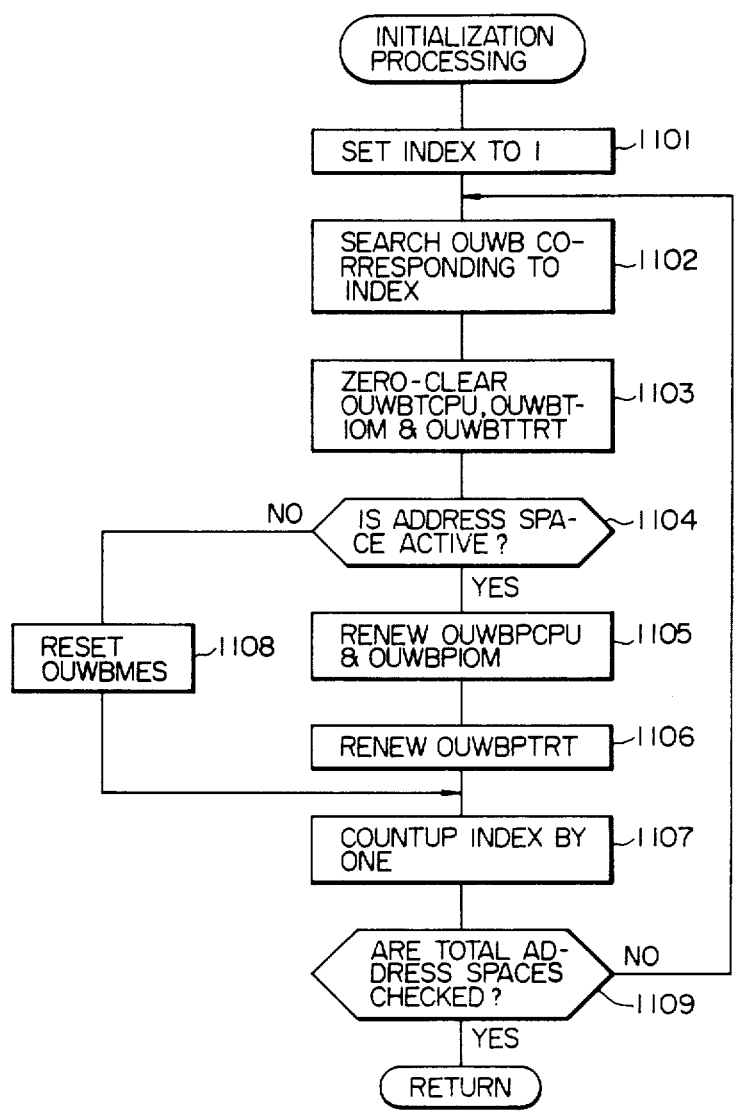
FIG. 11 is a flow chart showing the initialization of the workload calculating processing.

The accumulated EXCP number at the start of the I/O measurement, i.e., the value of the ASCBIOSM at that time is set in place of the present time in the area OUWBPIOM (1606) at the processing (1105) of the processing (as shown in FIG. 11) at the start of the WLM. These data will be referred to as "OUWBPIOM" hereinafter for simplificity. Moreover, the processings (1207), (1210), (1211) and (1212) at the processing (as shown in FIG. 12) when the measurement interval is reached become unnecessary, and the EXCP number accumulated from the previous measurement to the present measurement is decided and is set in the area WLDIOM 1702 (as shown in FIG. 17) at the processing (1208) in accordance with the following equation. These data will be expressed in letters "WLDIOM" for simplificity.

Accumulated EXCP Number
WLDIOM←(ASCBIOSM)−(OUWBPIOM)+(WLDIOM)

At the processing (1224), moreover, the accumulated total I/O Time WLDIOM 1702 is corrected as in the following when the average progress rate WLDAPR 1705 and the throughput coefficient WLDTRP 1704 (both being shown in FIG. 17) are to be decided:

WLDIOM×(WLDIOM)×(Average I/O Time per EXCP).

Namely, the product of the original data WLDIOM by the I/O time per EXCP is used as new data WLSIOM and is set in the area 1702.

Here, the average I/O time per EXCP is made to take a fixed value which is predetermined. After these corrections, the calculation of the processing (1224) is newly performed.

Thus, the throughput coefficient and the average progress rate coefficient can be approximately calculated.

As has been described hereinbefore, according to the present invention, the reasonable multiplicity of the jobs of the processors is decided in accordance with the actual workloads upon the processors constructing the digital computer system so that the selection of the jobs is accordingly controlled. As a result, it is possible partly to set such multiplicity of the job execution without troubling the operator as is proper for the workload status upon the processors at the start of the system and partly to dynamically control the multiplicity of the job execution in accordance with the fluctuations (e.g., the changes in the active TSS terminals) in the workload after the start of the system. Especially, this dynamic control can be performed for the respective processors in the loosely coupled multi processor system.

What is claimed is:

1. A method of controlling multiplicity of job execution in a computer system including at least one processor for executing jobs in parallel, said method comprising steps of:

(a) measuring used time periods of a central processing unit and an input/output device of said processor, respectively for respective executed jobs which are being executed in parallel in said processor during a measurement time interval;

(b) calculating an average progress rate which represents an average of progress rates of the respective executed jobs at which rates the respective executed jobs are processed by means of the central processing unit and the input/output device during the measurement time interval, said calculation being done from the measured used time periods of the central processing unit and the input/output device for the respective executed jobs; and (c) comparing the average progress rate with a predetermined limit; and (d) controlling the execution of a new job on said computer system as a function of said comparison.

2. A method according to claim 1, further including a step of measuring elapse times for the respective executed jobs during which the respective jobs are in an executed state, wherein the calculation of the average progress rate is based upon the measured used time periods of the central processing unit and the input/output device and the measured elapse time for the respective jobs.

3. A method according to claim 1 or 2, wherein the measurement of the used time period, the measurement of the elapse time, the calculation of the average progress rate and the determination are based on a common measurement time interval.

4. A method according to claim 2, wherein a progress rate of a job i is determined by the equation:

$$\frac{CPUi + IO_i}{ESTIMEi}$$

wherein CPUi and IOi are respectively measured used time periods for the job i of the central procressing unit add the input/output device, and ESTIMEi is the measured elapse time for the job i.

5. A method according to claim 3, wherein a progress rate of a job i is determined by the equation:

$$\frac{CPUi + IO_i}{ESTIMEi}$$

wherein CPUi and IOi are respectively measured used time periods for the job i of the central progressing unit and the input/output device, and ESTIMEi is the measured elapse time for the job i.

6. A method according to claim 5, wherein the average progress rate is determined by the equation:

$$\sum_{i}^{N}\left[\frac{ESTIMEi}{(\Sigma\ ESTIMEi)} \times \left(\frac{CPUi + IOi}{ESTIMEi}\right)\right]$$

wherein both summations are carried out with jobs executed during the measurement time interval and wherein N is the multiplicity of job execution for the measurement time interval.

7. A method according to claim 5, wherein the average progress rate is determined by the equation:

$$\sum_{i}^{N}\left[\frac{ESTIMEi}{(\Sigma\ ESTIMEi)} \times \left(\frac{CPUi + IOi}{ESTIMEi}\right)\right]$$

wherein both summations are carried out with jobs executed during the measurement time interval and wherein N is the multiplicity of job execution for the measurement time interval.

8. A method according to claim 5, wherein a job which ends during the measurement time interval is excluded from both summations, and a job which starts during the measurement interval is included in both summations.

9. A method according to claim 6, wherein a job which ends during the measurement interval is excluded from both summations, and a job which starts during the measurement interval is included in both summations.

10. A method according to claim 2, wherein a time period during which a job is swapped out because it is in a long time wait state is excluded from the elapse time of the job.

11. A method according to claim 2, wherein a time period during which a job is swapped out because it is in a terminal wait state is excluded from the elapse time of the job.

12. A method according to claim 1, wherein the determination if a new job is allowed to be executed is performed in such a manner that a new job is allowed to be executed in parallel to jobs which are already being executed if the average progress rate is greater than a predetermined upper limit, that a new job is not allowed to be executed even when one of jobs which are already being executed ends if the average progress rate is lower than a predetermined lower limit, and that a new job is allowed to be executed when one of jobs which are already being executed ends if the average progress rate is between the lower and upper limits.

13. A method according to claim 1, wherein measuring of the used time period of the input/output device for a job comprises the steps of counting a number of executed input/output access instructions issued by the job and multiplying the number with a predetermined average input/output access time.

14. A method according to claim 1, further comprising a step of measuring a total throughput during the measurement time interval of the processor for all jobs being executed in parallel wherein the determination is done if the total throughput is lower than a predetermined threshold.

15. A method according to claim 4, wherein the total throughput is determined by the equation:

$$\sum_{i} (CPUi + IOi)/\text{measurement interval},$$

wherein the summation is carried out with jobs executed during the measurement time interval, and CPUi and IOi are respectively used time periods of the central processing unit and the input/output device for a job i.

16. A method according to claim 15, wherein a job which ends during the measurement interval is excluded from the summation, and a job which starts during the measurement interval is included in the summation.

17. A method according to claim 14, further comprising a step of determining that a new job is allowed to be executed when one of jobs which are being executed in parallel ends, if the total throughput is larger than the threshold.

18. A method of controlling multiplicity of job execution in a computer system including at least one processor for executing jobs in parallel, said method comprising steps of:
 (a) measuring used time periods of a central processing unit and an input/output device of said processor, respectively for respective executed jobs which are being executed in parallel in said processor during a measurement time interval;
 (b) calculating an average of progress rates of the respective executed jobs at which rates the instructions of the respected jobs are executed by means of the central processing unit and the input/output device during the measurement time interval, said calculation being done from the measured used time periods of the central processing unit and the input/output device for the respective executed jobs;
 (c) comparing the average of progress rates with a predetermined limit; and
 (d) controlling the execution of a new job on said computer system as a function of said comparison.

* * * * *